April 29, 1952 B. R. CARSON 2,595,125

PHONOGRAPH

Filed Sept. 26, 1945 5 Sheets-Sheet 1

INVENTOR.
Benjamin R. Carson.
BY Harry Langsam
ATTORNEY.

April 29, 1952 B. R. CARSON 2,595,125

PHONOGRAPH

Filed Sept. 26, 1945 5 Sheets-Sheet 2

INVENTOR.
Benjamin R. Carson.
BY Harry Langsam
ATTORNEY.

April 29, 1952 B. R. CARSON 2,595,125

PHONOGRAPH

Filed Sept. 26, 1945 5 Sheets-Sheet 3

INVENTOR.
Benjamin R. Carson
BY Harry Langsam
ATTORNEY.

April 29, 1952 B. R. CARSON 2,595,125

PHONOGRAPH

Filed Sept. 26, 1945 5 Sheets-Sheet 4

INVENTOR.
Benjamin R. Carson
BY Harry Langsam
ATTORNEY.

April 29, 1952 B. R. CARSON 2,595,125

PHONOGRAPH

Filed Sept. 26, 1945 5 Sheets-Sheet 5

INVENTOR.
BENJAMIN R. CARSON
BY
Harry Langsam
attorney

Patented Apr. 29, 1952 2,595,125

UNITED STATES PATENT OFFICE 2,595,125

PHONOGRAPH

Benjamin R. Carson, Haddonfield, N. J., assignor, by mesne assignments, to Philco Corporation, Philadelphia, Pa., a corporation of Pennsylvania Application September 26, 1945, Serial No. 618,645

5 Claims. (Cl. 274—10)

Figure 1:
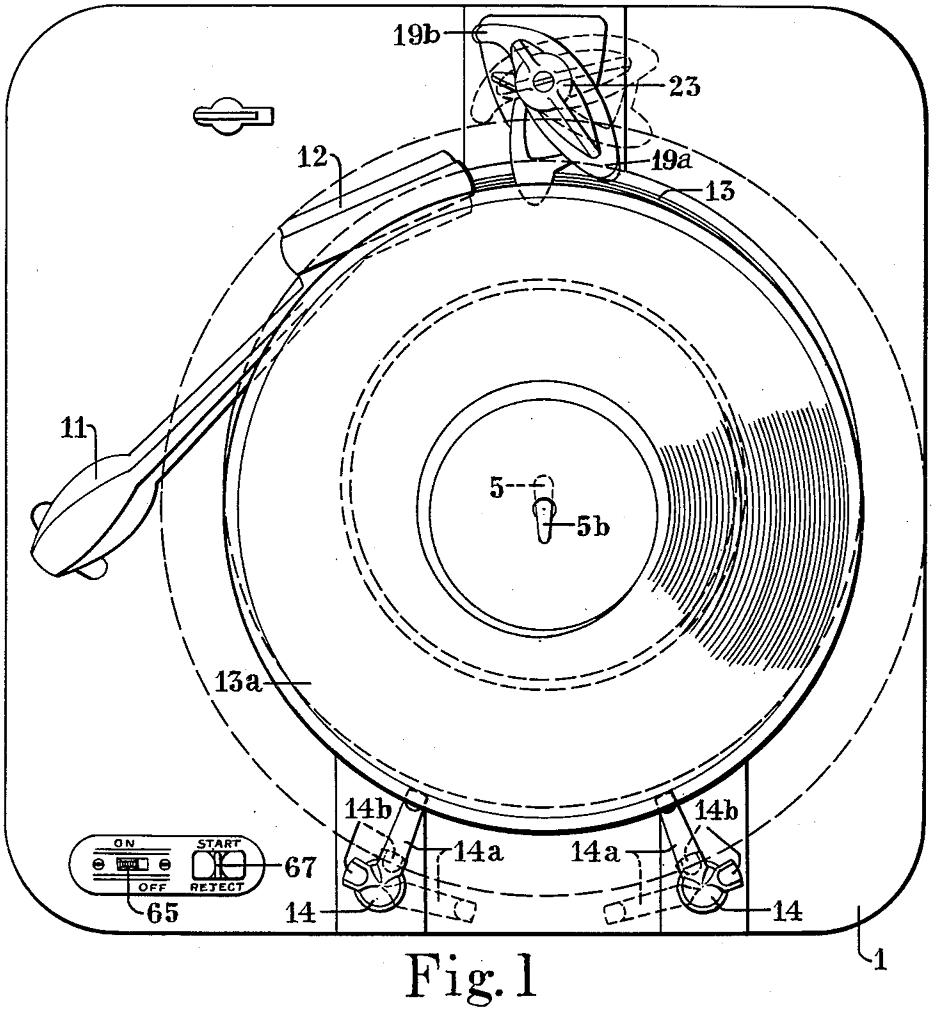

This invention relates to automatic phonographs and is particularly concerned with that type of automatic phonograph comprising, in general, record changing means adapted to support a stack of records above the turntable and operative to successively deliver the bottom-most record of the stack to the turntable for playing.

In automatic phonographs of the character above mentioned, means are provided for carrying out a sequence of operations including, in general, lifting of the tone arm or pick-up after the completion of the playing of the record, moving of the pick-up outwardly beyond the periphery of the record, delivering another record from the stack to the turntable, returning the pick-up horizontally to initial playing position, and causing the tone arm to be lowered into engagement with the marginal portion of the uppermost record on the turntable. Provision is also made for adjustment of the record changing means so as to handle either 10″ or 12″ records; and in such an arrangement a mechanism is provided (hereinafter referred to as the "indexing" mechanism) providing automatically for movement of the pick-up from its outermost position inwardly to the proper initial playing position for 10″ or 12″ records, according to the size being played.

Various features and mechanisms of the present invention are especially adapted to an automatic phonograph of the general nature referred to above, although it should be kept in mind that certain individual features are also applicable to automatic phonographs of other types.

With the foregoing general field of invention in mind, it is now pointed out that the principal and general objects of this invention include the provision of improved mechanisms and devices for performing various of the individual automatic functions, many of which are capable of employment individually without necessarily adopting other features of the invention; and also a novel and improved interrelationship of various of the mechanisms and devices for performing individual functions.

Moreover, the invention makes possible a striking overall simplification of the automatic mechanism, the automatic functioning of the phonograph being characterized by an unusual degree of reliability in action, notwithstanding the striking simplification of the mechanism, as contemplated.

With the above general objqects and purposes in view, the invention contemplates an arrangement of operating parts many of which are of greatly simplified form or construction as compared with mechanisms heretofore employed.

Another object of my invention is to provide an improved drop-type automatic phonograph which will be extremely quiet when changing records, and which will change records with minimum wear thereof.

Another object of my invention is to provide an improved drop-type automatic phonograph which will handle warped records without difficulty.

Another object of my invention is to provide an improved drop-type automatic phonograph which will be jamproof and in which, therefore, the danger of injuring the mechanism due to jamming is practically entirely eliminated.

Another object of my invention is to provide an improved drop-type automatic phonograph which is very compact and requires but a small cabinet space.

For example, according to the invention a single unitary cycling cam device is employed having cam tracks and other means associated therewith for controlling all of the primary automatic functions of the phonograph. This cam device and the operating elements associated therewith are so arranged as to greatly simplify fabrication of the cam device. To illustrate, the cam device of the invention has a plurality of cam tracks all of which are external and are presented for cooperation with associated operating parts in parallel planes, preferably horizontally below the base on which the turntable is mounted. In this way milling or other operations required for forming internal or recessed cam tracks are eliminated.

The general arrangement of the operating parts, including the cam device above mentioned, is such that the operating parts can effectively be made, in large part, in the form of simple flat levers or links, at least most of which may be readily fabricated from sheet metal by stamping.

The relative location of the primary elements of the phonograph, such as the tone arm support, the turntable, the record changing means and the cycling cam is such that the overall number of operating parts is reduced to a minimum. Thus, for the performance of various of the individual functions, the required motion is transmitted from the cycling cam device to the part to be operated directly through a single operating member, such as a lever or a link, which is in distinct contrast with various prior automatic phonographs in which motion is frequently transmitted through two or three or even more levers or other operating parts in order to perform a given function.

A novel arrangement of trip and associated actuating parts for initiating cycling operation of the cam device is also provided, as will further appear.

According to another feature of the invention a manual control is employed for selectively conditioning the phonograph for automatic or manual operation, this control being operative concurrently on the indexing mechanism and on the trip mechanism, so as to prevent initiation of cycling at the conclusion of the playing of a record and also to permit free manual movement of the pick-up in starting the playing of either 10″ or 12″ records.

Still another feature of importance is the provision of an improved form of means for mounting and moving the tone arm and the pick-up carried thereby, especially with respect to the lifting function. According to this feature the tone arm and an additional arm connected therewith to provide for lifting of the tone arm, are arranged, in general, in the form of a bellcrank, with the tone arm extending horizontally and the lifting arm extending generally vertically. The upright pivot providing for horizontal swinging of the tone arm is located intermediate the pick-up and the vertically extending lifting arm and the horizontal pivot providing for upward and downward movement of the pick-up is disposed within the angle formed between the horizontally extending tone arm and the generally upright lifting arm. In this way a mounting is provided such that lifting movement of the pick-up may be effected by reaction of a lever in a horizontal direction against the lower end of the vertical lifting arm. This is of advantage, particularly in association with a cycling cam device rotating in a horizontal plane, as is contemplated, since a simple vertically pivoted lever may then serve to transmit the required lifting motion from the cycling cam to the vertical lifting lever for the pick-up.

The location of the upright arm for lifting the tone arm, behind the vertical pivot provided for horizontal swinging of the tone arm and pick-up, constitutes an unusually simple arrangement for effecting the lifting function and also enables location of the vertical pivot for the tone arm closer to the center of the turntable than is practicable with various prior arrangements having an actuating connection for lifting the tone arm disposed ahead of the vertical tone arm pivot.

Still another feature of the invention is the provision of yielding means incorporated in the actuating connections for effecting movements of the tone arm, which yielding means permit manual movement of the tone arm to positions other than those adapted to be established by the automatic mechanism, to thereby avoid damage to the automatic mechanism. With reference to this feature it may be mentioned that it is of particular advantage that the lifting function is performed by a horizontally swinging lever, this lever being constructed in two flat parts which are yieldingly constrained to move together during automatic operation but which may be relatively displaced about the lever pivot in the event of manual movement of the pick-up to a position other than that adapted to be established by the cycling cam.

In accordance with another aspect of the invention, the cycling cam device has an idle position in which it remains during the playing of a record, and in this position one of the cam tracks thereof, preferably that associated with the tone arm lifting lever, is notched. The lever is also yieldingly urged into engagement with the cam, and as a result the lever and the notched portion of the cam serve as a means tending to retain the cam in its idle position. Creeping of the cam, for example, as a result of vibration, with consequent undesired operation of the automatic mechanism is thus avoided.

The foregoing and other objects and advantages of my invention I accomplish by providing upon a suitable base or platform a single rotatable record supporting member on one side of the turntable and a pair of stationary, cooperating record supporting members on the opposite side of the turntable. The turntable is provided with an upwardly extending spindle, the upper portion of which is bent forwardly toward the two stationary record supporting members. The rotatable record supporting member includes a record stack supporting shelf and a superposed record separating blade both at a higher elevation than the two stationary record supporting members but inclined downwardly toward the latter. Thus, when unplayed records are threaded onto the upper, inclined part of the spindle and the lowermost record is brought to rest against the aforementioned supporting shelf and the two stationary supporting members, the stack will be inclined toward the front of the cabinet and will face the user. This arrangement greatly facilitates loading of the records. The rotatable record supporting member is at such an elevation above the stationary record supporting members that the records of the stack supported thereby will be arranged in slightly eccentric, or somewhat laterally stepped relation along the upper, inclined spindle portion.

The movable record supporting member is so constructed that its supporting shelf and its separating blade can be rotated bodily as a unit through an angle of about 87° for adjustment to cooperate with either small records, such as 10 inch records, or large records, such as 12 inch records.

The two stationary supports are also mounted for limited rotational adjustment on the base or platform to one or another of two positions for accommodating either 10 inch or 12 inch records, depending on which size records will be played. By adjusting the movable record supporting member to one or the other of its aforementioned positions, it is automatically conditioned to be rotated either clockwise, for releasing 10 inch records, or counterclockwise for releasing 12 inch records, the same mechanism being employed for effecting rotation thereof in either direction. This arrangement affords a saving of parts while providing a safe and positive action for releasing records of either size. Adjustment of the movable record supporting member for either size record also automatically adjusts stop or indexing means which controls the landing position of the needle at the beginning of records of the selected size.

When the playing of a record has been completed, the backward movement of the pick-up due to the eccentric terminal groove on the record actuates a suitable trip device for operating normally inactive record changing mechanism. This mechanism includes a master cam assembly which causes the pick-up to be raised from the record and its arm to be swung outwardly clear of the record. The movable record supporting member is then rotated (clockwise for 10 inch records and counterclockwise for 12 inch records) to release the edge of the lowermost record supported thereby. The released record then begins to slide down along the inclined portion of the spindle which cams the released record away from the stationary supports and thus the record is completely released. Since the lowermost edge portion of the released record (that is, the portion adjacent the stationary supports) is quite close to the turntable, this edge portion reaches the turntable or the records previously accumulated thereon almost instantly and its fall is broken temporarily. The falling record then pivots on its lowermost edge toward the turntable in much the same way as the blades of a pair of scissors move pivotally toward each other.

This motion takes place in opposition to an air cushion under the falling record. The combination of pivotal movement and air cushion, coupled with the friction between the falling record and the spindle, so breaks the fall of the record that the record lands very quietly in playing position. Nevertheless, the released record reaches the landing position very quickly and its landing is so quiet as to be in marked contrast with the usual record clatter characteristic of prior art drop-type automatic phonographs. Immediately after the new record has landed, the needle is brought into playing position at the starting groove thereof, the mechanism for changing records is rendered temporarily inactive, the record is played, and the above described cycle is repeated.

To prepare the machine for playing, all that is necessary is to load the records on the three record supports, turn on the power, and push a combined start-and-reject button. This starts the record changing mechanism operating to release the lowermost record of the stack onto the turntable. Thereafter, the complete record changing cycle is repeated after each record has been played, the last record being repeated as a warning that the entire repertoire has been played. By pressing the aforementioned button, the record changing mechanism may be set into operation, and the next record released immediately, so that any record or unplayed portion thereof (except the very last or topmost record of the stack) can thus be rejected. After all of the records of a stack have been played, the entire stack can be removed easily without first having to swing the movable record supporting and releasing member out of the way, as in most prior art machines of this type. The records can then be turned around bodily as a unit and replaced on the record supports for playing the reverse sides thereof.

Figure 2:
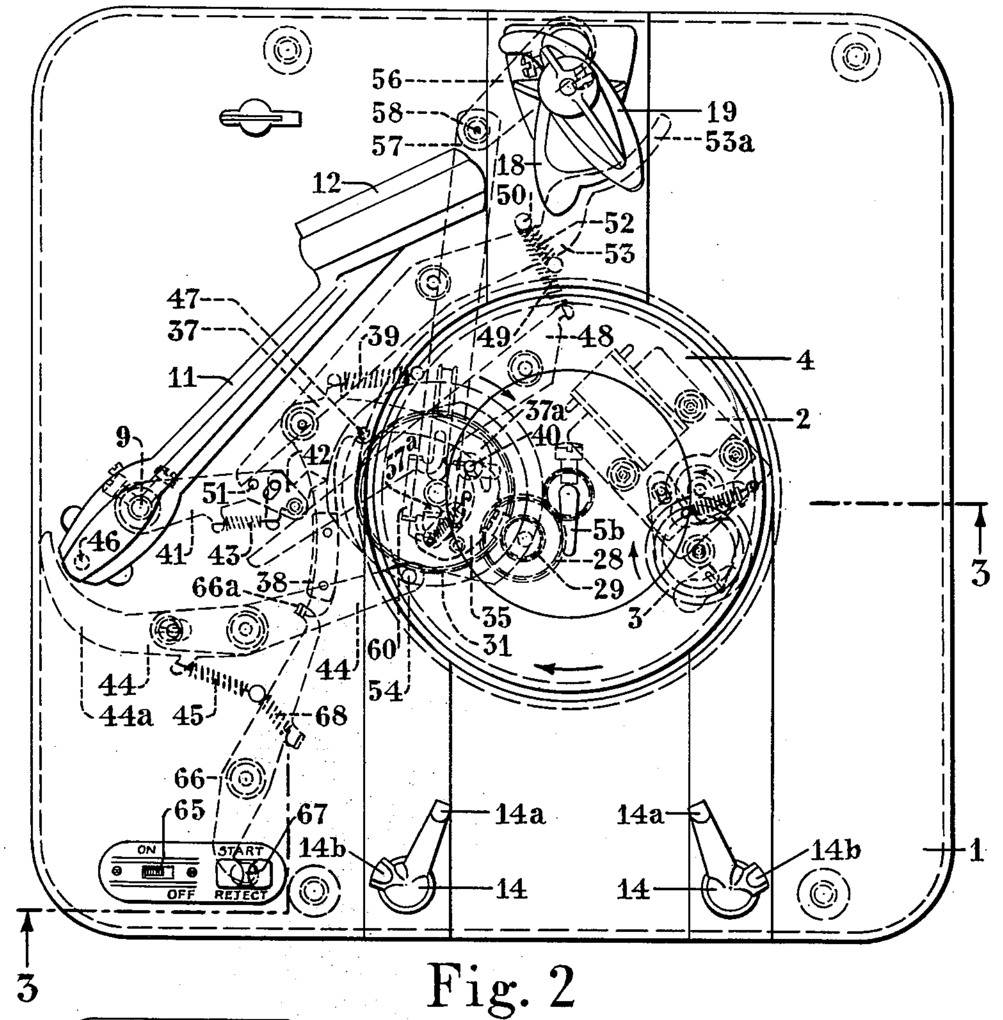
Figure 3:
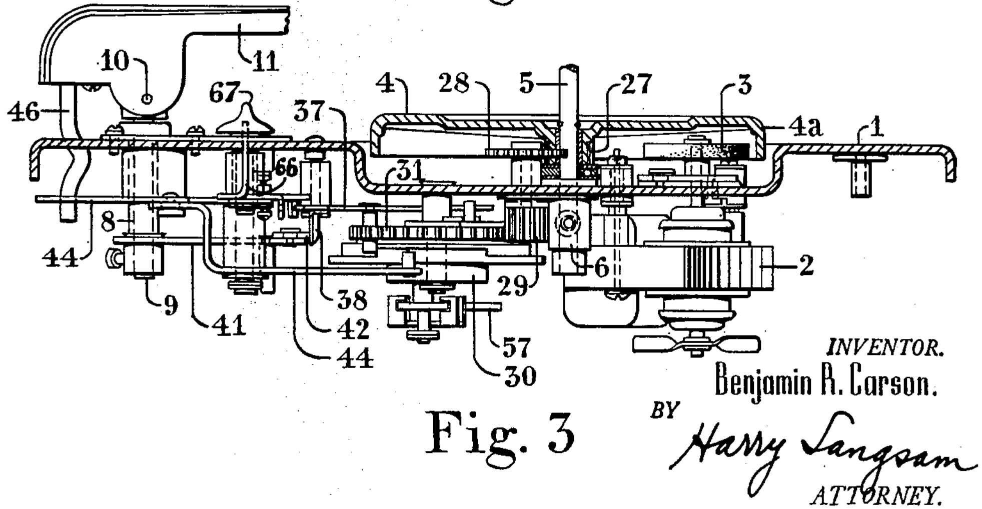

It will be understood that my invention is capable of receiving a variety of expressions. For purposes of illustration, however, I have shown one embodiment thereof and one modification in the accompanying drawings in which the same reference characters designate corresponding parts throughout, and in which:

Figure 1 is a top plan view of a phonograph constructed according to my present invention, the record supporting members being shown in solid lines in the 10 inch position and being shown in dash lines in the 12 inch position, Figure 2 is a similar view with the records removed and showing the mechanism under the base plate or motor board, Figure 3 is a sectional view taken approximately on the line 3—3 of Figure 2.

Figure 9:
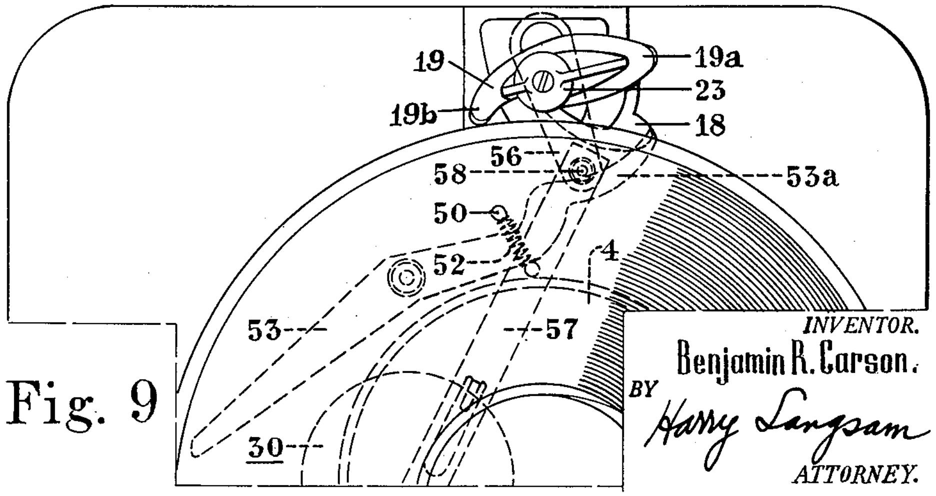
Figures 4, 5, 6, 7, 8:
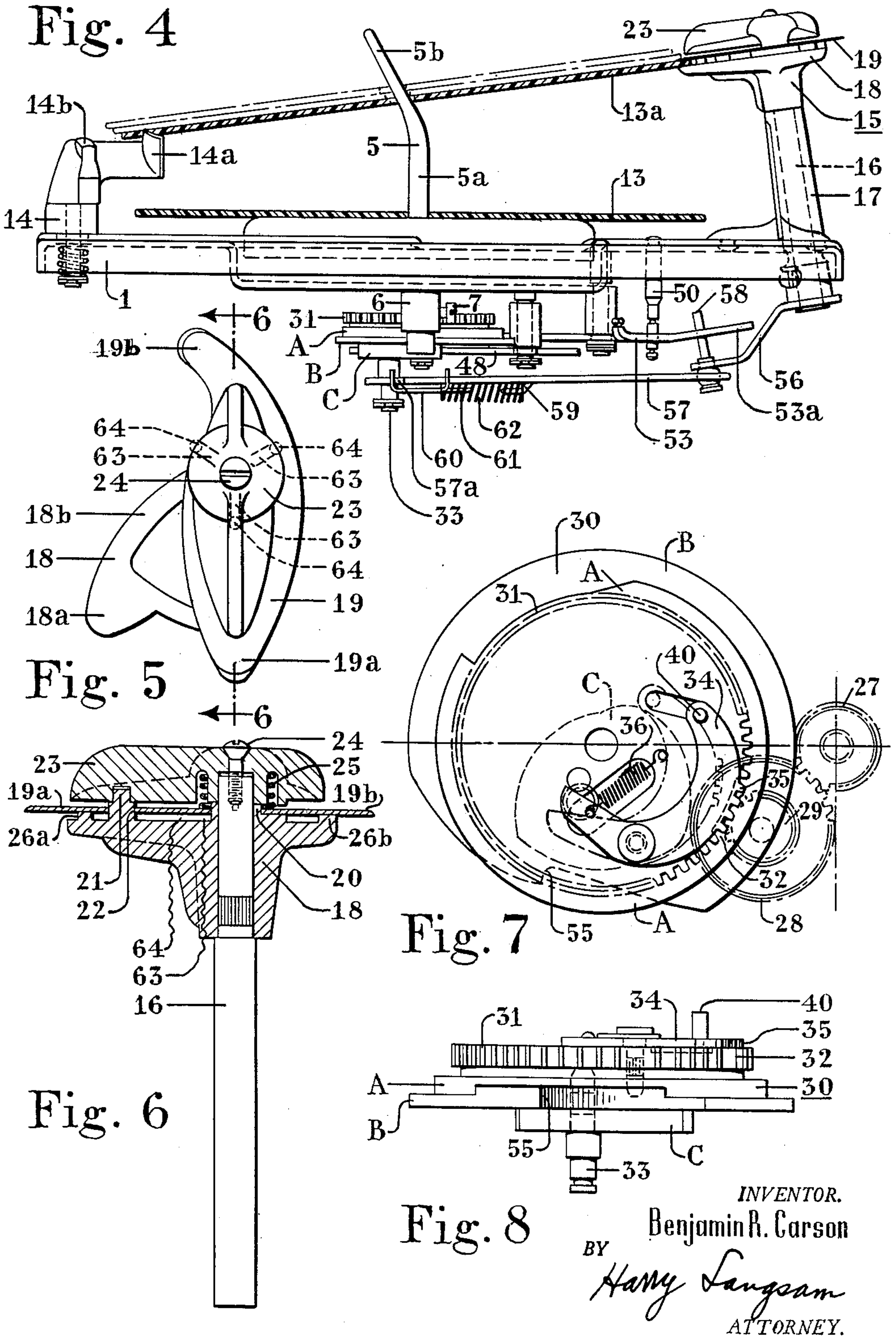
Figure 10:
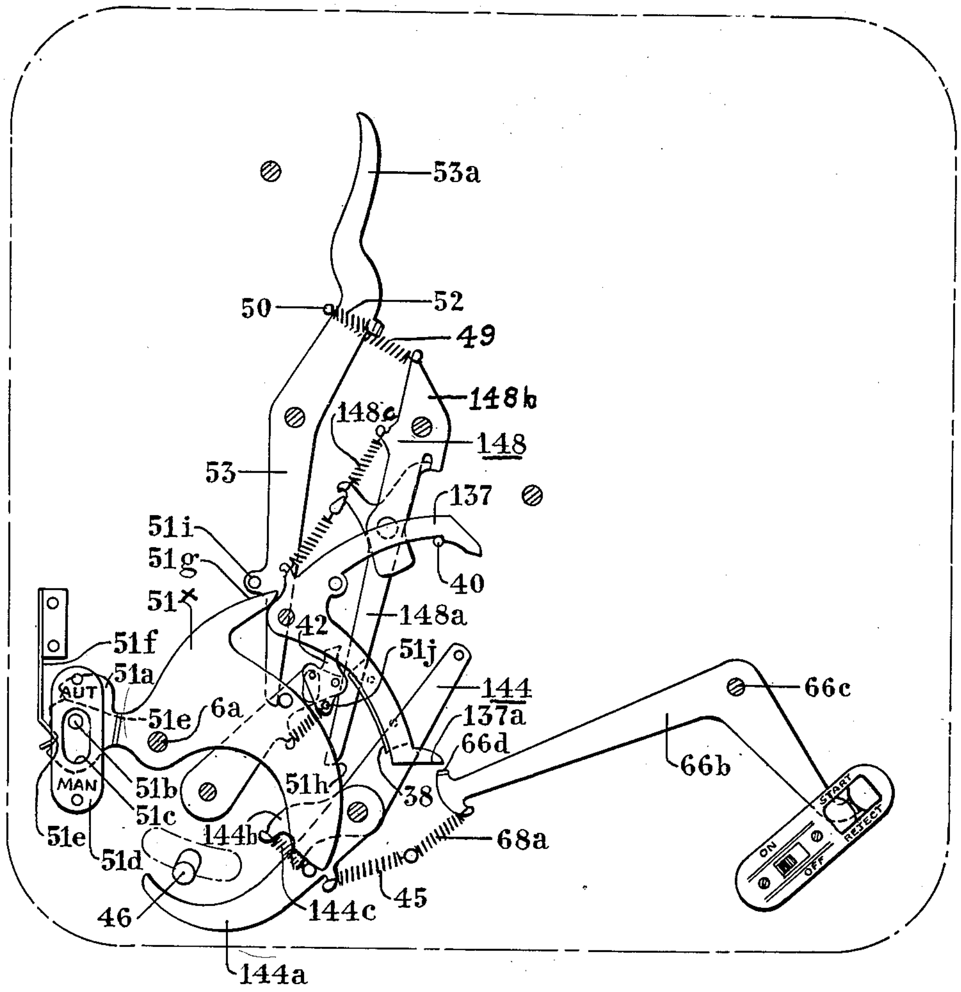
Figure 11:
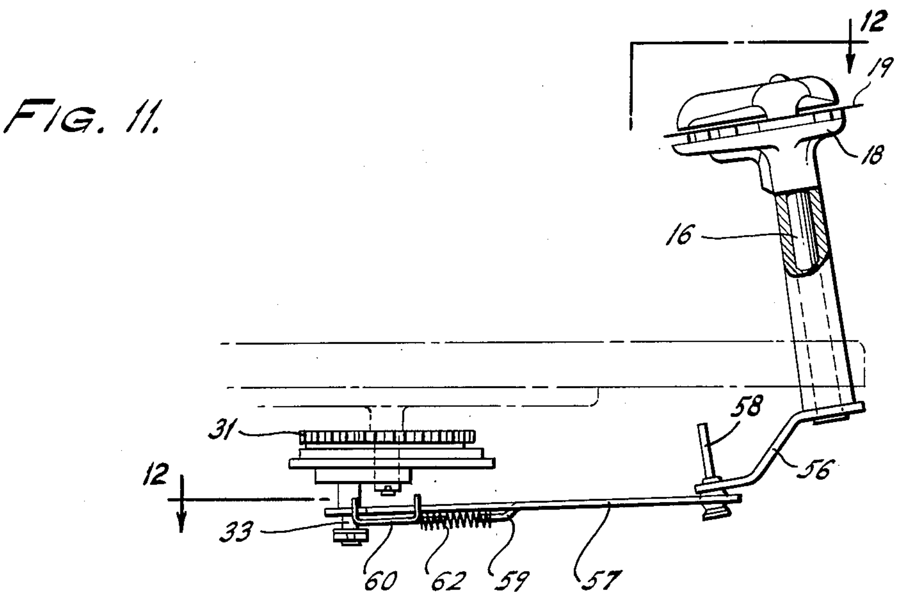
Figure 12:
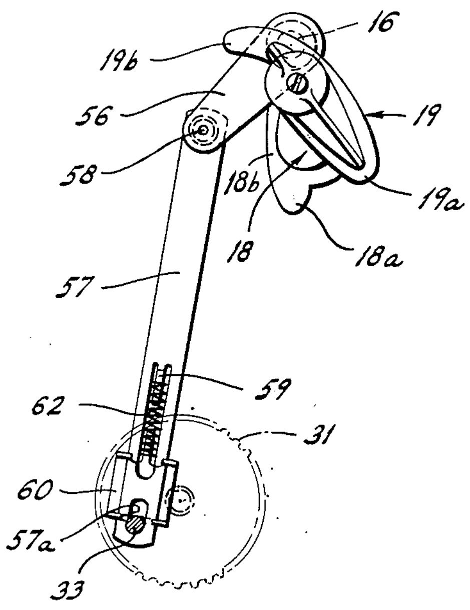
Figure 13:
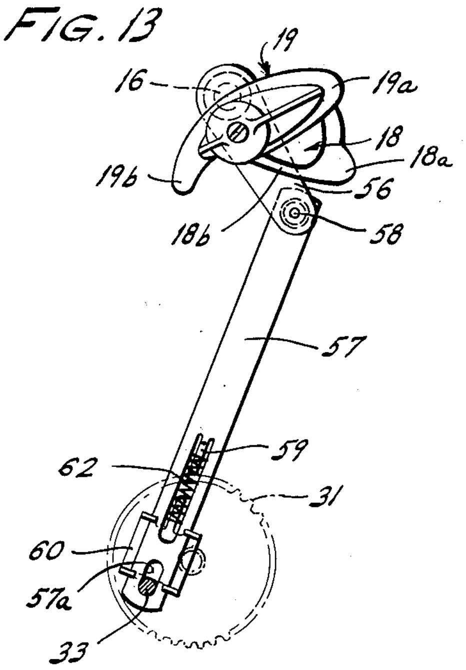

Figure 4 is a side elevation of the machine as shown in Figure 1 with certain parts removed and the records shown in section for the sake of clearness, Figure 5 is an enlarged top plan view of the movable record supporting member and the separator blade in assembled relation, Figure 6 is a sectional view thereof taken on the line 6—6 of Figure 5, Figure 7 is a plan view of the master gear and cam assembly, Figure 8 is a side elevation thereof, Figure 9 is a fragmentary view showing a portion of the mechanism of Figure 2 but with the parts in the position they occupy when the machine is set to play 12 inch records, Figure 10 is a detailed view of the system of levers, certain of which are modified to prevent jamming, and also illustrating a further control, Figure 11 is a detailed side view of the record supporting and releasing mechanism, Figure 12 is a top view taken on line 12—12 of Figure 11 with the record supporting members in the 10 inch position, and Figure 13 is a similar view with the record supporting members in the 12 inch position.

Referring in greater detail to the drawings, there is shown a base plate or motor board 1 which carries a motor 2 having a friction wheel 3 for driving a turntable 4 by engagement with the peripheral flange 4*a* thereof. The turntable is rotatably mounted on and in concentric relation to the lower end 5*a* of a spindle 5 which is locked to a sleeve 6 on the motor board by a screw 7. The upper portion 5*b* of the spindle is tapered and bent relative to the lower part 5*a* for purposes presently to be set forth. The entire spindle 5 has a smooth, continuous, unbroken surface from the turntable on up to its upper extremity.

Rotatably mounted in a bushing 8 on the motor board 1 is a post or shaft 9 which carries a horizontal shaft or pin 10 on which a pick-up arm 11 is mounted. The arm 11 can thus move horizontally over the turntable by reason of its shaft 9 and can move vertically relative to the turntable by reason of the pin 10. The arm 11 carries a pick-up 12 of any suitable type or construction for cooperation with a turntable supported record 13.

Records are supplied to the turntable 4 from a stack 13*a* threaded on the inclined spindle portion 5*b* and supported in inclined relation to the turntable 4 as best shown in Figure 4. For this purpose, there are provided on the motor board 1 a pair of normally stationary record supporting members 14 having supporting arms 14*a* for supporting 10 inch records and supporting arms 14*b* for supporting 12 inch records, and a movable record supporting and releasing member 15. The member 15 includes a post or shaft 16 which is rotatably carried in an inclined sleeve 17 on the motor board 1. The inclination of sleeve 17 and post 16, relative to the plane of turntable 4 is less than the inclination of spindle portion 5*b* relative to said plane. The upper end of the post 16 has secured to it a record supporting shelf 18 which floatingly carries a superposed record separating blade 19 having stack entering blade or knife portions 19*a* and 19*b* which extend from the axis of rotation of the member 15 in two different (not quite diametrically opposite) directions, as best seen in Figure 5. The shelf 18 extends over a substantial angle between the blade portions 19*a* and 19*b* and has a projecting part 18*a* terminating with a part 18*b* for a purpose hereinafter described in detail. The blade 19 is loosely mounted on a hub 20 on the support 18 for slight tilting movement relative to and for slight rotation on the support 18. Post 21 extends from the support 18 through an opening 22 in the blade 19 and into cover member 23 secured to the upper end of the post 16 by a screw 24. A coil spring 25 interposed between the cover 23 and the blade 19 may be used to normally maintain the blade 19 down against a pair of projections 26*a* and 26*b* on the member 18 which space the blade 19 from the record supporting parts 18*a*, 18*b* of the shelf 18 a distance substantially equal to the thickness of conventional disc records. The projection 26*b* is slightly higher than the projection 26*a* to space the knife blade 19b somewhat higher above the shelf 18 than the knife blade 19a so as to take care of differences in thickness between 10 inch records and 12 inch records.

As will be seen from the drawings, the stationary record supports 14 and the rotatable support 15 are spaced from each other circumferentially about the turntable 4, the supports 14 being located adjacent to each other on one side of the turntable and the support 15 being located on the diametrically opposite side of the turntable. All three of these supports may be adjusted bodily from the solid line positions shown in Figure 1 in which they accommodate 10 inch records to the dotted line positions for accommodating 12 inch records. In the solid line positions, the supporting arms 14a cooperate with the shelf portion 18a to support the 10 inch records, and in the dotted line positions, the arms 14b cooperate with the shelf portion 18a and 18b to support 12 inch records. In either case, however, the records are threaded on the spindle part 5b, which is inclined toward a line connecting the members 14, and the records are inclined relative to the turntable because the shelf 18 is at a higher elevation above the turntable than are the stationary supports 14. The shelf 18 and members 14 are so disposed relative to each other that they cause the records of the stack 13a to assume a somewhat eccentric or slightly stepped relation along the spindle portion 5b, as best seen in Figure 4, for a reason which will become more apparent as the description will proceed. The upper extremity of the spindle 5 is at an even higher elevation than the shelf 18 so that a substantial number of records can be accommodated. In operative position, whether for 10 inch records or for 12 inch records, the shelf 18 and the blade 19 are substantially parallel to the planes of the records in the stack 13a by reason of the inclination of the post 16. For operating the record changing mechanism and for restoring the pick-up to the starting positions of successive records transferred from the stack 13a to the turntable 4, the latter is provided with a pinion 27 which meshes with a gear 28 on the same shaft with a driving pinion 29. The pinion 29 is arranged to drive a cam and gear assembly 30 through a mutilated master gear 31 having a gap 32 in its periphery. The cam and gear assembly 30 is mounted for rotation as a unit on a common vertical axis, the gear 31 being concentric with said axis. The single cam has three cam members A, B and C and carries a depending stud 33 in eccentric relation to the axis of rotation of the cam assembly. As more clearly shown in Figures 4 and 8, the cam members A, B and C are arranged in superimposed relationship and provide generally horizontally presented cam tracks or surfaces to effect camming action in substantially parallel planes. Pivotally mounted on the gear 31 is a segment lever 34 formed with a gear segment 35 which is adapted to fill in the gap 32 and thus complete the driven gear 31 when in the solid line position of Figure 7 to which it is constantly urged by a spring 36. Normally, however, the lever 34 is held against the pull of the spring 36 in the dotted line position of Figure 7 by means presently to be described, and the cam and gear assembly 30 is stationary with the gap 32 opposite the constantly rotating driving pinion 29 and the driving connection between the pinion 29 and the main gear 31 broken.

Pivotally mounted on the motor board 1 for movement in a horizontal plane is a ratchet lever 37 carrying a ratchet 38 and constrained by a spring 39 to its extreme clockwise position as determined by engagement of a pin 47 on the lever 37 with the horizontally presented cam track of cam A. A trip lever 41 carrying a pivoted trip pawl 42 is secured to the lower end of the post 9 and moves in unison with the pick-up arm 11. During playing of a record, the trip pawl rides over the teeth of the ratchet 38 with no effect on the lever 37 due to a yielding spring connection 43 between the trip lever 41 and the trip pawl 42. However, when the end of a record with an eccentric terminal groove has been reached, the pick-up arm 11 and the trip lever 41 are given a reverse movement. This causes the pawl 42 to trip the lever 37 in known manner and to rotate it counterclockwise sufficiently to free a stud 40 on the segment lever 34. Hence, the spring 36 pulls the lever 34 into the full line position of Figure 7 and the teeth 35 are brought into engagement with the driving pinion 29. This initiates clockwise rotation of the gear and cam assembly 30 and brings the gear 31 into driving engagement with the pinion 29 for a full revolution of this assembly.

Pivotally mounted on the motor board 1 for horizontal movement is a two-part lever 44 (best seen in Figs. 2 and 3) for elevating the pick-up arm 11. The lower part of the lever 44 cooperates with the horizontally presented cam track provided on cam B of the cam assembly 30 in response to the pull of a spring 45 and the upper part thereof has a hooked or curved portion 44a which cooperates with a downwardly extending post 46 on the pick-up arm 11. As soon as the cam assembly starts to rotate, the cam B actuates the lever 44 through a cam follower stud 54 thereon to raise the pick-up arm off the played record and to hold it in elevated position. At the same time, cam A of the assembly 30 cooperates with the stud 47 on the ratchet lever 37 to hold the latter in a position such that its ratchet 38 will be out of the path of the pawl 42 when the pick-up arm 11 is swung outwardly beyond the periphery of the played record.

For swinging the pick-up arm 11 outwardly clear of the played record, a lever 48 is pivotally mounted on the motor board 1 for swinging movement in a horizontal plane and is held against the horizontally presented cam track on cam C of the cam assembly 30 by a spring 49 which connects the lever 48 with a fixed pick-up cam indexing post 50 on the motor board. When the cam assembly 30 begins to rotate, it moves the lever 48 clockwise toward a pin 51 on the trip lever 41. The cams B and C are so timed that, after the lever 44 has raised the pick-up arm off the played record, the cam C will bring the lever 48 into engagement with the pin 51 to swing the lever 41 counterclockwise, thereby also swinging the pick-up arm 11 to a position clear of the record 13, since the lever 41 and the pick-up arm 11 are both locked to the shaft 9 for movement in unison.

Pivotally mounted on the motor board 1 and held in engagement with the pin 51 by a spring 52 is a pick-up arm locating lever 53 for locating the pick-up at the proper starting points of either 10 inch or 12 inch records. When the lever 48 acts on the pin 51 to rotate the trip lever 41 counterclockwise as above described, it simultaneously causes the lever 53 to turn clockwise against the pull of the spring 52. After the pick-up arm 11 has been moved clear of the record 13, a new record is released from the stack 13a in a manner to be presently described and the newly released record slides down along the spindle 5 onto the previously played record. The cam assembly 30 has by this time rotated enough to bring the receding portion of the cam C into engagement with the lever 48. Consequently, the lever 48 begins its return movement toward rest position in response to the pull of the spring 49. Since the spring 52 is also pulling on the lever 53, it forces the lever 53 to rotate counterclockwise. In turn, the lever 53 acts on the pin 51 to bring the pick-up arm back toward the new record. Eventually, the lever 53 engages the fixed pin 50 and stops, thereby stopping the pick-up arm 11 in correct starting position above a 10 inch record. Continued rotation of the cam assembly permits the lever 48 to return to its rest position shown in Figure 2. At this time, the receding portion of the cam B permits the spring 45 to pull the lever 44 away from the post 46 and the pick-up is thus lowered onto the new record.

During rotation of the cam assembly 30, the cam A, cooperating with the stud 47, holds the ratchet lever 37 in position to be clear of the pawl 42. At about the time the cam B is ready to permit lowering of the pick-up on the new record, the cam assembly has reached a position where the stud 40 engages the lever 37 and backs the lever 37 away slightly from the cam A. Shortly thereafter, the stud 40 reached the curved end 37a of the lever 37 whereby the segment lever 34 is caused to rotate on its pivot in a counterclockwise directon and its gear tooth segment 35 is withdrawn from over the gap 32 in the master gear 31. Thus, when the gap 32 is opposite the pinion 29, the drive coupling between the pinion 29 and the gear and cam assembly 30 is broken and this assembly stops rotating. The stud 54 then snaps into a dwell 55 in the cam B to hold the assembly 30 in its rest position.

Secured to the lower end of the post 16 is a lever 56 for movement in unison with the movable record supporting member 15. Pivoted on the eccentric stud 33 of the cam assembly 30 is a lever 57 which is also pivotally connected to the lever 56 by an upwardly extending post 58. The post 58 extends up far enough to lie in the path of movement of the curved end 53a of the pick-up arm return lever 53, as presently to be described, and serves to index the return of the pick-up arm to the proper starting point over a 12 inch record.

The eccentric stud 33 is received in a slot 57a in the lever 57 so that the lever 57 can slide in the direction of its own length on the stud 33 as well as pivot on the stud 33. The relationship of the eccentric stud 33 within the slot 57a provides a lost motion connection. The lever 57 is also formed with a tongue 59 and slidably carries a slide member 60 which is formed with an oppositely extending tongue 61. A coil spring 62 mounted on the tongues 59 and 61 constantly urges the slide 60 to the left against the eccentric stud 33 (Figure 4) and at the same time urges the lever 57 to its extreme right hand position as viewed in the same figure.

When the movable record supporting and releasing device 15 is adjusted manually to the 10 inch record position, the levers 56 and 57 are automatically adjusted thereby to the position shown in Figure 2, and the parts are releasably held in this position by the spring 62. When the movable record supporting member 15 is in this position, the lowermost one of a stack of 10 inch records rests on the portion 18a of the supporting shelf 18. Upon rotation of the cam assembly 30, as above described, the eccentric stud 33 actuates the lever 57, causing it to turn the lever 56 and the movable record supporting device 15 in a clockwise direction. The parts are so timed that, when the pickup arm 11 has been moved clear of the last played record, the member 15 will begin to rotate to cause the knife edge 19a to enter the stack between the lowermost record and the next record. The record supporting shelf 18 is simultaneously withdrawn from under the lowermost record of the stack, thereby releasing the record. The released record then starts to drop down toward the turntable and the inclined spindle portion 5b cams the falling record off the stationary supporting arms 14a. When freed from the latter, the record then slides down quickly and smoothly toward the turntable, being cushioned in its fall by the air thereunder and by the friction between it and the spindle 5, as above described. After the cam assembly 30 has made a half revolution, the movable record supporting member 15 is rotated in the opposite direction to remove the blade 19 from under the new lowermost record of the stack and to bring the shelf 18 under the last mentioned record for supporting the stack during playing of the last released record. It will be noted that, when the levers 56 and 57 are in the position shown in Figure 2, the post 58 is entirely clear of the pick-up arm return lever 53 and that the fixed post 50 is effective to index the return of the pick-up arm to the starting position of 10 inch records.

When the machine is adjusted to play 12 inch records, so that the stationary supporting members 14 and the movable supporting member 15 occupy the dotted line positions shown in Figure 1, the levers 56 and 57 are automatically swung to the position shown in Figure 9. This is permitted by reason of the yielding connection offered by the spring 62 between the lever 57 and the eccentric stud 33. The 12 inch record stack now rests on the stationary arms 14b and on the portions 18a and 18b of the record supporting shelf 18. This time, when the cam assembly 30 starts to rotate, the lever 57 will cause the lever 56 and the movable record supporting device 15 to rotate in a counter-clockwise direction to cause the knife edge 19b to enter the stack and to remove the supporting shelf portions 18a and 18b from under the lowermost record. It will be noted, from Figure 9, that the adjustable indexing post 58 is now in the path of return movement of the curved end 53a of the lever 53. Consequently, when the lever 53 returns the pick-up arm 11 to starting position over the 12 inch record, the end 53a thereof strikes the post 58 before the lever 53 has reached the fixed post 50. Thus, the pick-up arm is brought to the proper starting point over the new record.

Inasmuch as standard records vary somewhat in thickness and records often become warped, it is necessary to make provision for variations in thickness so that the separator blade 19 will always enter the stack between the two lowermost records thereof. For this purpose, the member 18 may be provided with a plurality of grooves 63 in which are received downwardly extending, rounded projections 64 on the separator blade 19. Should either of the knife edges 19a or 19b strike the edge of the lowermost record in the stack, the blade 19 will be momentarily arrested while the shelf 18 continues to rotate. Hence, the slots 63, acting on the projections 64, will raise the blade 19 slightly and thus enable it to enter between the two lowermost records.

On the other hand, should either of the knife edges 19*a* or 19*b* strike the edge of the next highest record above the lowermost one, then, in that case, the then leading or active knife edge will be tilted downwardly somewhat by the curved edge of that record to again enter the stack freely and without damaging the record. This is permitted by reason of the floating mounting of the blade 19 on the shelf 18 and is greatly facilitated, especially with 12 inch records, by the stepped relation of the records in the stack.

To operate my improved record changer, it is merely necessary to adjust the record supporting members 14 and 15 to the position corresponding to the size of records to be played and to thread a stack of such records on the spindle 5. A switch 65 on the motor board 1 in series with motor 2 is turned to the "on" position to start the motor. The turntable 4 then begins to rotate. Pivotally mounted on the motor board 1 is a lever 66 which may be actuated by an upwardly extending starting button 67 adjacent the switch 65 and which has a downwardly extending projection 66*a* arranged to engage the adjacent end of the ratchet lever 37. After turning on the switch 65, the starting button 67 is moved to the left against the pull of a spring 68 to thereby cause the projection 66*a* to engage the ratchet lever 37 and move it counterclockwise in the same manner as does the trip pawl 42 in response to the eccentric terminal groove of a record. This initiates the record changing cycle, and the lowermost record of the stack is released for transference to the turntable in the manner described above. Obviously, if it is desired to reject a record, the starting button 67 is actuated to operate the reject lever 66 in the manner above set forth. It will be apparent, therefore, that unwanted records may be rejected at any time either before playing thereof has begun or before completion of playing thereof. When the entire stack of records has been played, the stack may be removed from the turntable bodily as a unit without the necessity of first moving any of the record supporting members out of the way. The stack may then be reversed bodily and rethreaded on the spindle 5 for immediate playing of the other sides of the respective records.

In Figure 10, there is shown mechanism whereby the phonograph may be operated either automatically or manually at the option or the control of the user; hence, either a series of records in a stack may be played automatically in succession, or a single record may be played by placing one record at a time on the turntable upon manual removal of the last played record on the turntable. For this purpose, a lever 51*x* is pivoted on a stud 6*a* (see Figure 10) beneath the motor board of the phonograph, and the lever 51*x* functions primarily to render the automatic record changing mechanism inoperable.

A button 51*b*, securely attached to one end 51*a* of the lever 51*x*, projects through an elongated opening 51*c* in a plate 51*d*, which plate is located upon the upper surface of the motor board 1. An opening in the motor board complements the elongated opening 51*c* in the plate 51*d* so that the button passes through the motor board. The plate 51*d* has thereon visual markings or indications of "AUT" meaning automatic position and "MAN" meaning manual position. By moving the button 51*b*, the lever 51*x* may be swung on its pivot to either the automatic position or the manual position. The lever 51*x* is held in either one or the other of these positions by a locking spring member 51*f* which is arranged to engage in one or the other of a pair of V-shaped notches 51*e* formed in the adjacent edge of the end 51*a* of the lever 51*x*, that is, when the spring member 51*f* is in engagement with the lower notch 51*e*, the button 51*b* is in "AUT" or automatic position, meaning that the automatic apparatus of the phonograph will play a stack of records; and when the locking spring member engages the upper notch 51*e*, then the button 51*b* is in the "MAN" or manual position so that a single record will be played and the automatic mechanism will be inoperable.

The lever 51*x* also includes a projected edge portion 51*g* and an arcuate edge portion 51*h*. When the lever 51*x* is moved to its manual position, the edge 51*g* thereof engages a pin 51*i* which is on the pick-up arm locating lever 53 and holds the lever 53 against the pressure of the spring 52 to prevent the lever from operating to return the pick-up arm, and the arcuate edge 51*h* engages a pin 51*j* on the trip pawl 42 to hold the pawl 42 in a position in which it cannot cooperate with the ratchet 38 to initiate operation of the record changing mechanism.

It will be noted that, in Figure 10, the location of the phonograph mechanism in relation to the motor board 1 and the construction of the start-reject lever have been changed from that of Figure 2. This is made desirable by reason of the addition of the automatic-manual control shown in Figure 10. The start-reject lever 66*b*, which operates similarly to the start-reject lever 66, is pivoted on a stud 66*c* and has a projection 66*d* thereon to engage one end 137*a* of a lever 137 which functions in the same manner as the lever 37. A spring 68*a* normally holds the lever 66*b* in spaced relation to the lever end 137*a*. When the lever 66*b* is rotated clockwise upon being moved to start the phonograph or to reject a record which is being played, its projection 66*d* will engage the lever end 137*a* to turn the lever 137 counterclockwise and cause the automatic record changing mechanism to operate.

In Figure 10, there are also shown modified forms of the tone arm elevating lever and the tone arm swinging lever, each being made of two yieldingly connected parts. Thus, the tone arm elevating member 144 consists of two parts 144*a* and 144*b* which are yieldingly connected to each other by a spring 144*c*, the purpose of this construction being to permit the two parts 144*a* and 144*b* to yield relative to each other should there be any interference with the intended function of the member 144. In such case, the part 144*a* will yield relative to the part 144*b* even though the latter is actuated by its cam, so that breaking or jamming of the parts of the mechanism is prevented. Similarly, the tone arm swinging member 148 is made of two parts 148*a* and 148*b* which are yieldingly connected by a spring 148*c*. Hence, if the tone arm or pick-up arm should become stuck for any reason and resist normal movement of the member 148, the part 148*a* thereof will yield relative to the part 148*b* and the tone arm will not be forced nor will the associated parts be injured.

It is pointed out that the arm or post 46 which extends downwardly from the pick-up carrying arm 11, is connected to pivot with the pick-up and is arranged to provide for vertical movement of the pick-up by swinging of said downwardly extending arm in a horizontal direction. For that purpose, as more clearly shown in Figure 3, the pivotal mounting 19 for the vertical movement of the pick-up carrying arm 11 is located at a point intermediate the length of the latter, that is, between the pick-up and the downwardly extending arm 46. Thus, in effect, the substantially horizontal pick-up carrying arm 11 and its downwardly extending substantially upright arm 46 provide a general bellcrank shaped device for mounting and moving the pick-up, which device is pivoted for movement about a point located within the angle formed between said arms to cause lifting and lowering of the pick-up through a simple horizontal motion of the operating lever 44. Also, it is to be noted that the depending arm 46 which pivots with the pick-up is located behind and relatively close to the pivotal mounting 19 as compared with the location of the pick-up itself with reference to its pivotal mounting. In this manner it is possible to associate the lifting lever 44 with the depending arm 46 at a point relatively close to the pivotal mounting, so that the required degree of vertical movement of the pick-up may be obtained with but a small horizontal displacement of the lifting lever. Moreover, it is to be noted, as will more clearly appear from Figure 2, that the portion 44a of the lifting lever 44 which is adapted to engage the downwardly extending arm 46, is curved in a horizontal plane about a center point lying substantially on the axis of the upright pivot 9. Because of this arrangement, the horizontal swinging movement of the downwardly extending arm 46 about said upright pivot axis is obtained without extensively influencing the vertical position of the pick-up 12 when swung horizontally over the turntable.

Although I have shown only one embodiment with modification of my invention in the accompanying drawings and have described this structure with great detail herein, it will undoubtedly be apparent to those skilled in the art that my invention is susceptible of various embodiments. Consequently, I desire that my invention shall not be limited excepting insofar as is made necessary by the prior art and by the spirit of the appended claims.

I claim:

1. In an automatic phonograph of the record-dropping type, a record supporting and releasing device, a post pivotally mounted and carrying said device for manual selective placement either in one position to accommodate a stack of records of one diameter or in another position to accommodate a stack of records of another diameter, a driving member mounted to revolve in one direction only, a pivot eccentrically disposed on said member, said pivot and post defining a straight line-of-centers, a pair of levers pivotally interconnected at one of their end portions, one lever having its other end portion connected to said pivot, the other lever having its other end portion connected to said pivotal post, and lost-motion means including a spring at the connection between one lever and one of its pivots, said lost-motion means providing for shifting of the levers from one side to the other side of said straight line-of-centers in response to manual placement of the record supporting and releasing device in one or the other of its mentioned positions, said spring normally maintaining the pivotally interconnected levers out of alignment with said straight line-of-centers, whereby said levers when shifted to one side of said line-of-centers impart first clockwise and then counterclockwise oscillation to said record supporting and releasing device to effect release of a record of one diameter during one revolution of said driving member, and whereby said levers when shifted to the other side of said line-of-centers impart first counterclockwise and then clockwise oscillation to said record supporting and releasing device to effect release of a record of the other diameter during a revolution of said driving member.

2. The arrangement set forth in claim 1, in which the record supporting and releasing device includes two stack-entering portions extending in different directions, one of said portions serving to release records of one diameter and the other of said portions serving to release records of the other diameter.

3. The arrangement set forth in claim 1, in which the record supporting and releasing device includes a blade having opposite end portions adapted to enter a stack of records, one of said end portions serving to release records of one diameter, and the other of said end portions serving to release records of the other diameter.

4. The arrangement set forth in claim 1, in which the lost-motion means takes the form of a slot in the mentioned one lever, the pivot of said other lever being slidably received in said slot, and the spring pressing against said lever and said pivot and urging said pivot in engagement with one end of said slot.

5. The arrangement set forth in claim 1, in which the lost-motion means is located between the pivot which is eccentrically mounted on the driving member and the end portion of the lever which is connected with said pivot.

BENJAMIN R. CARSON.

REFERENCES CITED

The following references are of record in the file of this patent:

UNITED STATES PATENTS

| Number | Name | Date |
|---|---|---|
| 915,448 | Krueger et al. | Mar. 16, 1909 |
| 1,701,450 | Gordon-Cumming | Feb. 5, 1929 |
| 1,938,810 | Collison et al. | Dec. 12, 1933 |
| 2,063,199 | Slater | Dec. 8, 1936 |
| 2,216,029 | Wright | Sept. 24, 1940 |
| 2,220,435 | Wright | Nov. 5, 1940 |
| 2,230,106 | Erwood | Jan. 28, 1941 |
| 2,270,995 | Compare | Jan. 27, 1942 |
| 2,323,472 | Johnson et al. | July 6, 1943 |
| 2,351,972 | Johnson | June 20, 1944 |
| 2,352,331 | Leline | June 27, 1944 |
| 2,374,080 | Dale | Apr. 17, 1945 |
| 2,397,932 | Erwood et al. | Apr. 9, 1946 |
| 2,457,106 | Pressley | Dec. 21, 1948 |
| 2,480,623 | Ballentine et al. | Aug. 30, 1949 |
| 2,484,570 | Johnson | Oct. 11, 1949 |

FOREIGN PATENTS

| Number | Country | Date |
|---|---|---|
| 406,354 | Great Britain | Feb. 26, 1934 |
| 407,952 | Great Britain | Mar. 20, 1934 |
| 418,583 | Great Britain | Oct. 25, 1934 |
| 419,299 | Great Britain | Nov. 5, 1934 |
| 882,849 | France | June 16, 1943 |